US011270666B1

(12) United States Patent
Thien et al.

(10) Patent No.: US 11,270,666 B1
(45) Date of Patent: Mar. 8, 2022

(54) SYNCHRONIZING PREFERENCES BETWEEN MULTIPLE DISPLAYS

(71) Applicant: Dell Products L.P., Round Rock, TX (US)

(72) Inventors: Vui Khen Thien, Singapore (SG); Dung Loung Hii, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/061,974

(22) Filed: Oct. 2, 2020

(51) Int. Cl.
*G09G 5/12* (2006.01)

(52) U.S. Cl.
CPC .......... *G09G 5/12* (2013.01); *G09G 2370/02* (2013.01)

(58) Field of Classification Search
CPC ..... G06F 3/14; G06F 3/0484; G09G 2352/00; G09G 2360/06; G09G 5/12
See application file for complete search history.

(56) References Cited

U.S. PATENT DOCUMENTS 8,892,691 B2 * 11/2014 Pantos .................. H04L 65/607
                                                                             709/219
2016/0371163 A1 * 12/2016 Swierk ................ G06F 11/2294

* cited by examiner

*Primary Examiner* — Robert J Michaud
(74) *Attorney, Agent, or Firm* — Baker Botts L.L.P.

(57) ABSTRACT

Method and system for synchronizing preferences between multiple displays, including receiving, at a first display device, a signal indicating a second display device is coupled to the first display device and in a powered-on state; receiving, at the first display device, model information of the second display device indicating that the second display device is supported; comparing, at the first display device, a supported protocol version of the first display device and the supported protocol version of the second display device to identify a lowest supported protocol version of the supported protocol version of the first display device and the supported protocol version of the second display device; setting, by the first display device, a lowest supported protocol version indicator as the lowest supported protocol version among the supported protocol version of the first display device and the supported protocol version of the second display device.

20 Claims, 6 Drawing Sheets

SYNCHRONIZING PREFERENCES BETWEEN MULTIPLE DISPLAYS

BACKGROUND

Field of the Disclosure

The disclosure relates generally to an information handling system, and in particular, synchronizing preferences between multiple displays connected to the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in method for synchronizing preferences between multiple displays, the method including receiving, at a first display device, a signal indicating a second display device is coupled to the first display device and in a powered-on state, the first display device coupled to an information handling system; providing, by the first display device, a request to the second display device for a model information of the second display device; in response to the request for the model information, i) receiving, at the first display device, the model information of the second display device indicating that the second display device is supported, and ii) providing, by the first display device, a request to the second display device for a supported protocol version of the second display device, the supported protocol version of the second display device indicating at least display parameters of the second display device; in response to the request for the supported protocol version, receiving, at the first display device, the supported protocol version of the second display device; comparing, at the first display device, a supported protocol version of the first display device and the supported protocol version of the second display device to identify a lowest supported protocol version of the supported protocol version of the first display device and the supported protocol version of the second display device, the supported protocol version of the first display device indicating at least display parameters of the first display device; setting, by the first display device, a lowest supported protocol version indicator as the lowest supported protocol version among the supported protocol version of the first display device and the supported protocol version of the second display device; transmitting, by the first display device, the lowest supported protocol version indicator to the second display device; and transmitting, by the first display device, display preferences to the second display device, the display preferences based on the lowest supported protocol version indicator.

Other embodiments of these aspects include corresponding systems, apparatus, and computer programs, configured to perform the actions of the methods, encoded on computer storage devices.

These and other embodiments may each optionally include one or more of the following features. For instance, receiving, at the second display device, a signal indicating a third display device is coupled to the second display device and in a powered-on state; providing, by the second display device, a request to the third display device for a model information of the third display device; in response to the request for the model information, i) receiving, at the second display device, the model information of the third display device indicating that the third display device is supported, and ii) providing, by the second display device, a request to the third display device for a supported protocol version of the third display device, the supported protocol version of the third display device indicating at least display parameters of the third display device; in response to the request for the supported protocol version, receiving, at the second display device, the supported protocol version of the third display device; comparing, at the second display device, the supported protocol version of the second display device and the supported protocol version of the third display device to identify a lowest supported protocol version of the supported protocol version of the second display device and the supported protocol version of the third display device; and transmitting, by the second display device, the lowest supported protocol version of the supported protocol version of the second display device and the supported protocol version of the third display device to the first display device. Comparing, at the first display device, i) the supported protocol version of the first display device and ii) the lowest supported protocol version of the supported protocol version of the second display device and the supported protocol version of the third display device; setting, by the first display device, the lowest supported protocol version indicator as the lowest supported protocol version among i) the supported protocol version of the first display device and ii) the lowest supported protocol version of the supported protocol version of the second display device and the supported protocol version of the third display device; and transmitting, by the first display device, the lowest supported protocol version indicator to the second display device. Transmitting, by the second display device, the lowest supported protocol version indicator to the third display device in response to receiving the lowest supported protocol version indicator from the first display device. Transmitting, by the first display device, display preferences to the second display device, the display preferences based on the lowest supported protocol version indicator; and transmitting, by the second display device, display preferences to the third display device, the display preferences based on the lowest supported protocol version indicator. Receiving, at the second display device, the display preferences; in response to receiving the display preferences, calculating, at the second display device, a checksum value for the second display device based on the display preferences; receiving, at the second display device, a checksum value for the third display device; determining that the checksum value for the third display device is not the same as the checksum value for the second display device; and in response to the determining, transmitting, by the second display device, the display preferences to the third display device. The second display device transmits the lowest supported protocol version of the supported protocol version of the second display device and the supported protocol version of the third display device to the first display device only in response to receiving the supported protocol version of the third display device. In response to the request for the model information, receiving, a time out signal; and in response to the time out signal, setting an indictor to indicate that the second display device is not supported.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses methods and systems for synchronizing preferences between multiple display devices connected to an information handling system. In short, the multiple display devices can be connected together to form a chain of multiple display devices. The multiple display devices can be synchronized such that display parameters that are updated on a particular display device are propagated to the other connected display devices (via upstream and downstream synchronization). For example, if the luminance is changed at a particular display device, the particular display device can propagate the updated luminance parameter setting to the other display devices that are connected ultimately to the particular display device.

Specifically, this disclosure discusses a system and a method of synchronizing preferences between multiple displays, the method comprising: receiving, at a first display device, a signal indicating a second display device is coupled to the first display device and in a powered-on state, the first display device coupled to an information handling system; providing, by the first display device, a request to the second display device for a model information of the second display device; in response to the request for the model information, i) receiving, at the first display device, the model information of the second display device indicating that the second display device is supported, and ii) providing, by the first display device, a request to the second display device for a supported protocol version of the second display device, the supported protocol version of the second display device indicating at least display parameters of the second display device; in response to the request for the supported protocol version, receiving, at the first display device, the supported protocol version of the second display device; comparing, at the first display device, a supported protocol version of the first display device and the supported protocol version of the second display device to identify a lowest supported protocol version of the supported protocol version of the first display device and the supported protocol version of the second display device, the supported protocol version of the first display device indicating at least display parameters of the first display device; setting, by the first display device, a lowest supported protocol version indicator as the lowest supported protocol version among the supported protocol version of the first display device and the supported protocol version of the second display device; transmitting, by the first display device, the lowest supported protocol version indicator to the second display device; and transmitting, by the first display device, display preferences to the second display device, the display preferences based on the lowest supported protocol version indicator.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Figure 1:
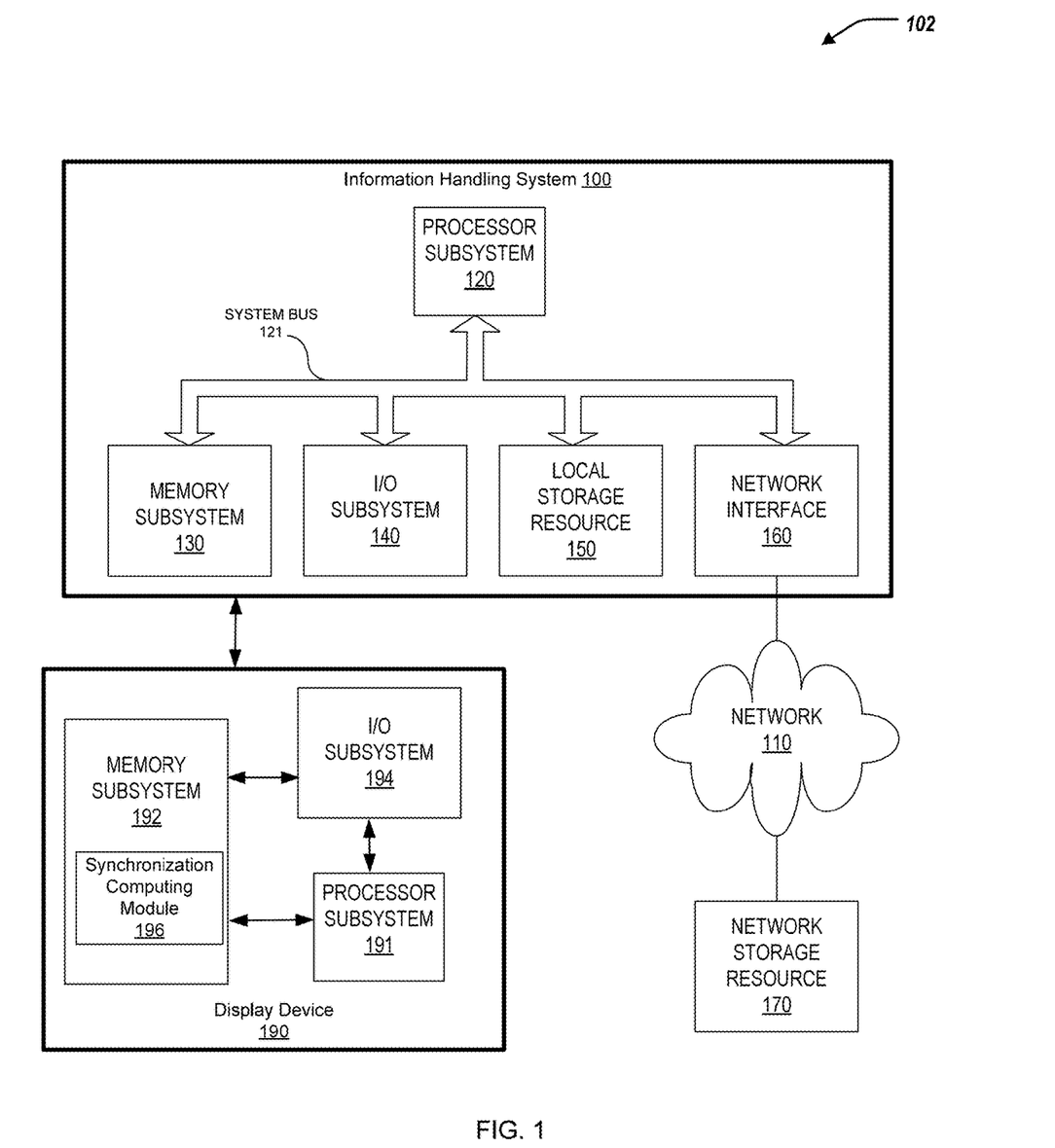
FIG. 1 is a block diagram of selected elements of an embodiment of a computing environment.

Turning now to the drawings, FIG. 1 illustrates a block diagram depicting selected elements of a computing environment 102 including an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, T1, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The computing environment 102 can further include one or more display devices 190. The display device 190 can be coupled to the information handling system 100 (e.g. through a dock or directly) and can be in communication with the information handling system 100.

The display device 190 can include a processor subsystem 191, similar to the processor subsystem 120. The processor subsystem 191 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 191 may interpret and/or execute program instructions and/or process data stored locally. In the same or alternative embodiments, processor subsystem 191 may interpret and/or execute program instructions and/or process data stored remotely.

The display device 190 can include a memory subsystem 192 and an I/O subsystem 194. Similar to that mentioned above with respect to memory subsystem 130, memory subsystem 192 may comprise a system, device, or apparatus operable to retain and/or retrieve program instructions and/or data for a period of time (e.g., computer-readable media). Memory subsystem 192 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to display device 190 is powered down.

The display device 190 can further include an I/O subsystem 194, similar to the I/O subsystem 140. I/O subsystem 194 may comprise a system, device, or apparatus generally operable to receive and/or transmit data to/from/within display device 190. I/O subsystem 194 may represent, for example, a variety of communication interfaces for interacting with other display devices, and/or the information handling system 100.

The processor subsystem 191, the memory subsystem 192, and the I/O subsystem 194 can be in communication with each other (e.g., over a system bus).

The memory subsystem 192 can include a synchronization computing module 196. The synchronization computing module 196 can include a computer-executable program (software).

In short, the computing environment 102 can include multiple display devices 190 connected together to form a chain of multiple display devices. To that end, when the computing environment 102 includes multiple display devices 190, display parameters can be synchronized between the display devices 190. For example, if a display parameter such as luminance is changed on a first display device 190, the adjustment to the luminance is propagated to other synchronized display devices 190, described further herein.

Figure 2:
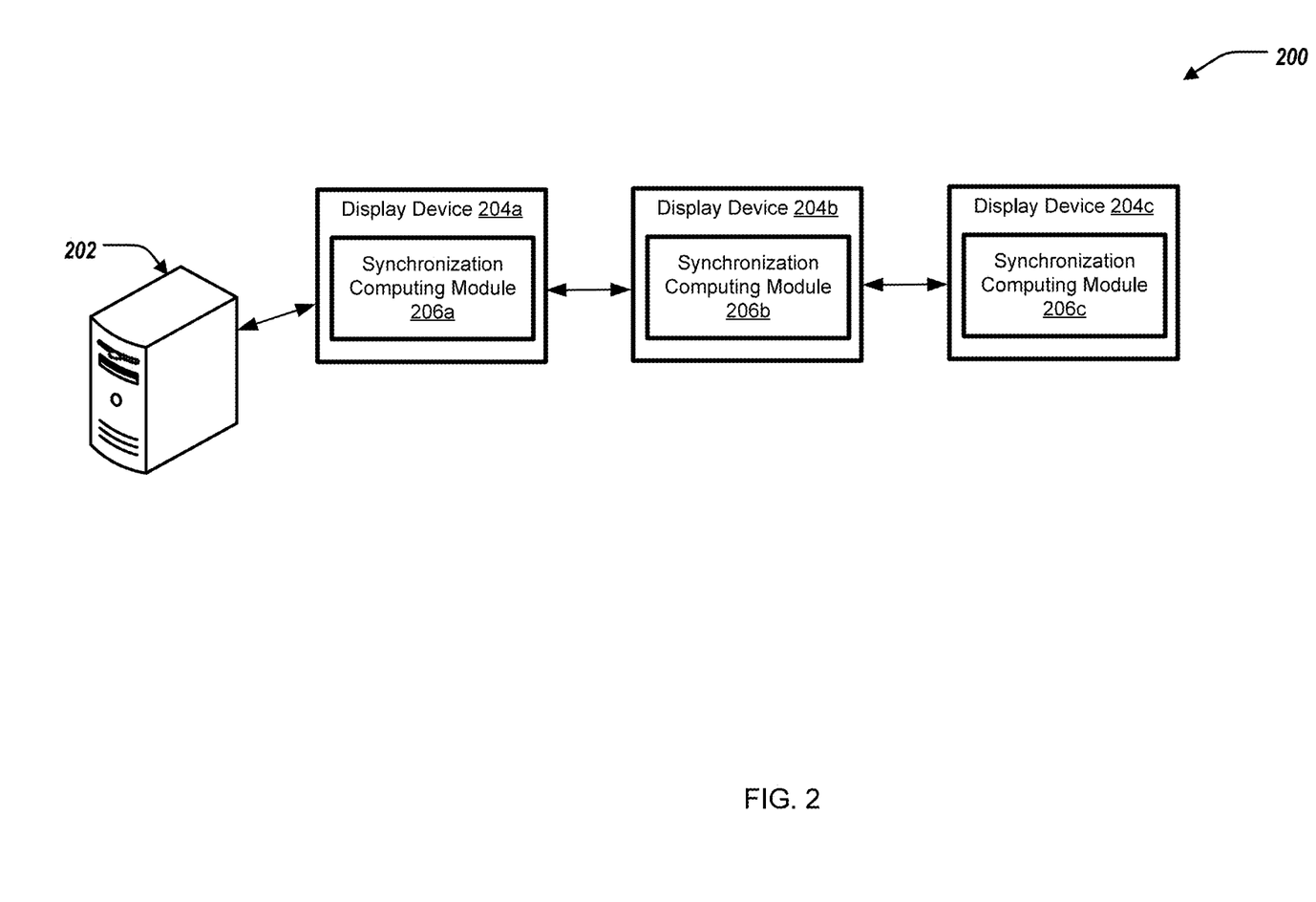
FIG. 2 illustrates a block diagram of a computing environment for synchronizing preferences between multiple display devices connected to an information handling system.

Turning to FIG. 2, FIG. 2 illustrates an environment 200 including an information handling system 202; and including display devices 204a, 204b, 204c (collectively referred to as display devices 204). The environment 200 is shown including three display devices 204; however, the environment 200 can include any number of display devices 204.

The (first) display device 204a can be coupled to the information handling system 202; the (second) display device 204b can be coupled to the (first) display device 204a; and the (third) display device 204c can be coupled to the (second) display device 204b. The information handling system 202 can be similar to, or include, the information handling system 100 of FIG. 1. The display devices 204 can be similar to, or include, the display device 190 of FIG. 1.

The display device 204a can include a synchronization computing module 206a; the display device 204b can include a synchronization computing module 206b; and the display device 204c can include a synchronization computing module 206c. The synchronization computing modules 206a, 206b, 206c can be collectively referred to as synchronization computing modules 206. The synchronization computing modules 206 can be similar to, or include, the synchronization computing module 196 of FIG. 1.

The display devices 204 can be in communication with each other (and the display device 204a with the information handling system 202) over sideband communication channels that are bi-directional such as a VESA Display Data Channel Command Interface (DDCCI), a VESA DisplayPort Auxiliary Channel, or a USB Type-C Power Delivery Vendor Defined Messaging scheme.

Figure 3:
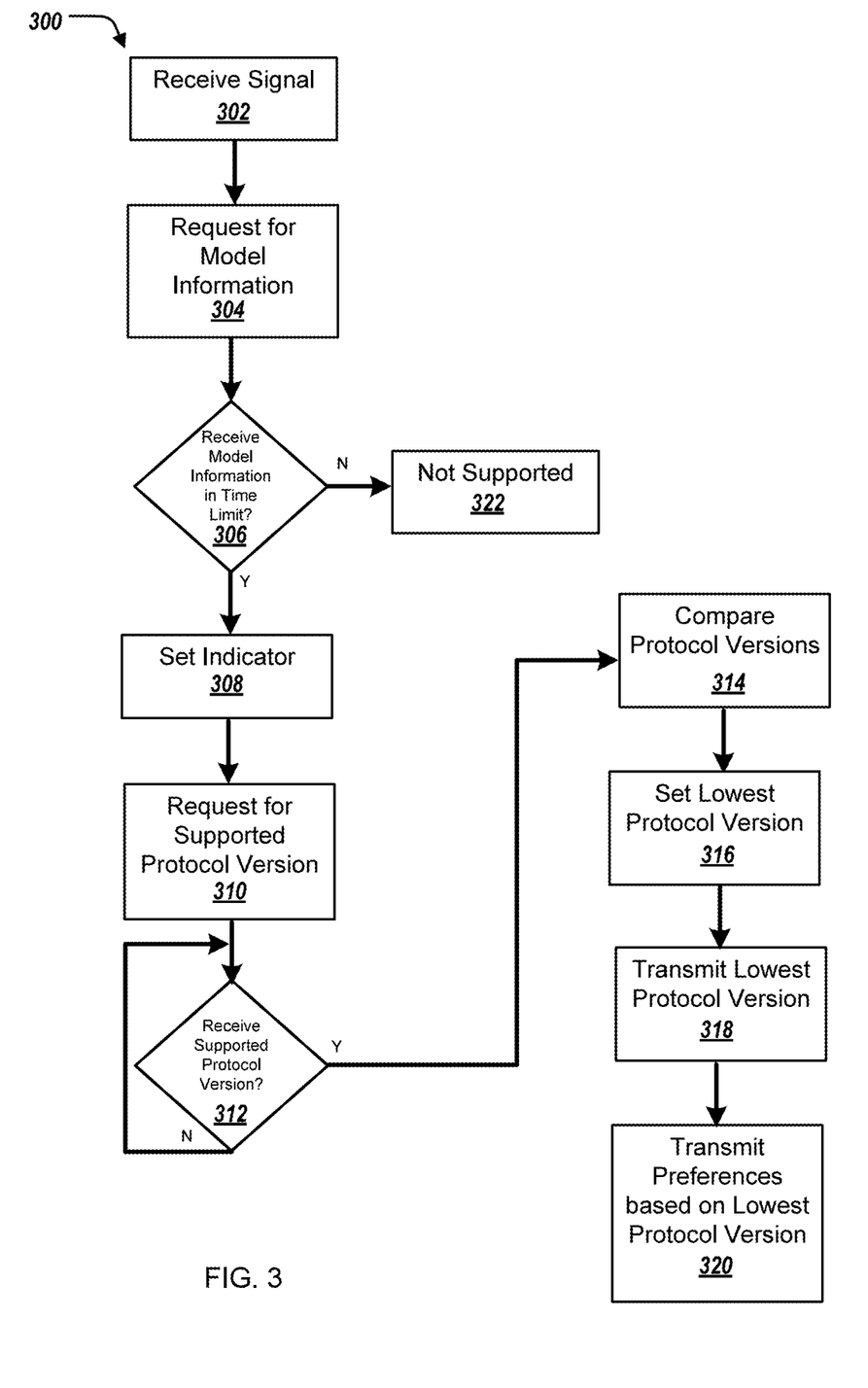
FIGS. 3-5 illustrates respective methods for synchronizing preferences between multiple display devices connected to an information handling system.

FIG. 3 illustrates a flowchart depicting selected elements of an embodiment of a method 300 for synchronizing preferences between the multiple displays 204 connected to the information handling system 202. The method 300 may be performed by the information handling system 100, the information handling system 202, the display devices 204 and/or the synchronization computing module 206, and with reference to FIGS. 1-2. It is noted that certain operations described in method 300 may be optional or may be rearranged in different embodiments.

The first display device 204a can receive a signal from the second display device 204b indicating that the second display device 204b is coupled to the first display device 204a and is in a powered-on state (302). The first display device 204a can provide a request to the second display device 204b for model information of the second display device 204b (304). For example, the first display device 204a provides the request to the second display device 204b for the model information of the second display device 204b in response to receiving the signal from the second display device 204b indicating that the second display device 204b is coupled to the first display device 204a and is in a powered-on state. In some examples, the model information of the second display device 204b can include identifying information of the second display device 204b, including model name, model type, and other similar information.

The first display device 204a determines if the model information is received from the display device 204b within a time limit (threshold) (306). That is, the first display device 204a can determine if the model information is received from the second display device 204b within a time limit (or threshold) of providing the request for the model information. In other words, when the first display device 204a receives the model information from the second display device 204b within the time limit (or threshold), the second display device 204b is considered a "non-legacy" display device.

When the first display device 204a receives the model information from the second display device 204b within the time limit, the first display device 204a sets an indicator to indicate that the second display device 204b is supported for synchronization (308). That is, when the second display device 204b is supported for synchronization, the second display device 204*b* can be synchronized with another display device such as the first display device 204*a* (e.g., display parameters of the second display device 204*b* are able to be synchronized). In some examples, the first display device 204*a* sets the indicator in response to the request for the model information.

The first display device 204*a* provides a request to the second display device 204*b* for a supported protocol version of the second display device 204*b* (310). In some examples, the first display device 204*a* provides the request for the supported protocol version in response to the request for the model information. The supported protocol version of the second display device 204*b* can indicate at least display parameters of the second display device 204*b*. For example, the display parameters can include brightness, contrast, color gamut, and similar.

The first display device 204*a* determines if the supported protocol version of the second display device 204*b* is received (312). For example, the first display device 204*a* determines if the supported protocol version of the second display device 204*b* is received in response to the request for the supported protocol version.

When the first display devices 204*a* determines that the supported protocol version of the second display device 240*b* is received, the first display device 204*a* compares a supported protocol version of the first display device 204*a* and the supported protocol version of the second display device 204*b* (314). The first display device 204*a*, in response to the comparing, can identify a lowest (or minimum) supported protocol version of the supported protocol versions of the first display device 204*a* and the second display device 204*b*. The supported protocol version of the first display device 204*a* can indicate at least display parameters of the first display device 204*a*. For example, the display parameters can include brightness, contrast, color gamut, and similar.

In other words, the first display device 204*a* negotiates a supported protocol version that is common to both the first display device 204*a* and the second display device 204*b*.

The first display device 204*a* can set a lowest (or minimum) supported protocol version indicator (lowest protocol version) as the lowest supported protocol version among the supported protocol versions of the first display device 204*a* and the second display device 204*b* (316).

The first display device 204*a* can transmit the lowest supported protocol version indicator (lowest protocol version) to the second display device 204*b* (318). The first display device 204*a* can transmit display preferences to the second display device 204*b* based on the lowest supported protocol version indicator (lowest protocol version) (320).

In some examples, when the first display device 204*a* does not receive the model information from the second display device 204*b* within the time limit, the first display device 204*a* sets a time out signal and sets an indicator to indicate that the second display device 204*b* is not supported (322). That is, in some examples, when the second display device 204*b* is not supported for synchronization, the second display device 204*b* cannot be synchronized with another display device such as the first display device 204*a* (e.g., display parameters of the second display device 204*b* are not able to be synchronized). In other words, when the first display device 204*a* does not receive the model information from the second display device 204*b* within the time limit (or threshold), the second display device 204*b* is considered a "legacy" display device.

In some examples, when the first display devices 204*a* determines that the supported protocol version of the second display device 240*b* has not been received, the method 300 returns to step 312 and waits until the first display devices 204*a* determines that the supported protocol version of the second display device 240*b* has been received.

Figure 4:
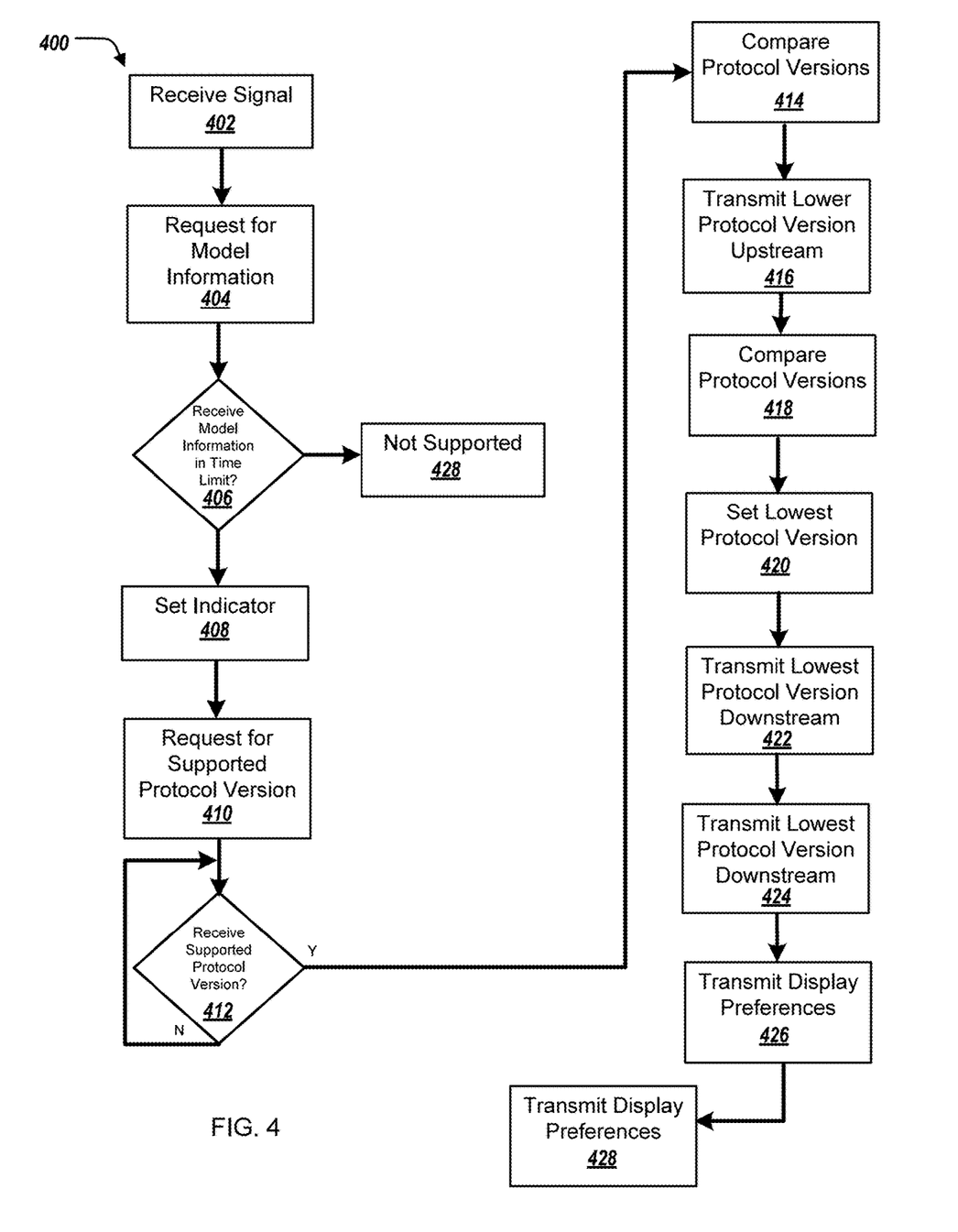

FIG. 4 illustrates a flowchart depicting selected elements of an embodiment of a method 400 for synchronizing preferences between the multiple displays 204 connected to the information handling system 202. The method 400 may be performed by the information handling system 100, the information handling system 202, the display devices 204 and/or the synchronization computing module 206, and with reference to FIGS. 1-2. It is noted that certain operations described in method 400 may be optional or may be rearranged in different embodiments.

The second display device 204*b* can receive a signal from the third display device 204*c* indicating that the third display device 204*c* is coupled to the second display device 204*b* and is in a powered-on state (402).

The second display device 204*b* can provide a request to the third display device 204*c* for model information of the third display device 204*c* (404). For example, the second display device 204*b* provides the request to the third display device 204*c* for the model information of the third display device 204*c* in response to receiving the signal from the third display device 204*c* indicating that the third display device 204*c* is coupled to the second display device 204*b* and is in a powered-on state. In some examples, the model information of the third display device 204*c* can include identifying information of the third display device 204*c*, including model name, model type, and other similar information.

The second display device 204*b* determines if the model information is received from the third display device 204*c* within a time limit (threshold) (406). That is, the second display device 204*b* can determine if the model information is received from the third display device 204*c* within a time limit (or threshold) of providing the request for the model information. In other words, when the second display device 204*b* receives the model information from the third display device 204*c* within the time limit (or threshold), the third display device 204*c* is considered a "non-legacy" display device.

When the second display device 204*b* receives the model information from the third display device 204*c* within the time limit, the second display device 204*b* sets an indicator to indicate that the third display device 204*c* is supported for synchronization (308). That is, when the third display device 204*c* is supported for synchronization, the third display device 204*c* can be synchronized with another display device such as the second display device 204*b* or the first display device 204*a* (e.g., display parameters of the third display device 204*c* are able to be synchronized). In some examples, the second display device 204*b* sets the indicator in response to the request for the model information.

The second display device 204*b* provides a request to the third display device 204*c* for a supported protocol version of the third display device 204*c* (410). In some examples, the second display device 204*b* provides the request for the supported protocol version in response the request for the model information. The supported protocol version of the third display device 204*c* can indicate at least display parameters of the third display device 204*c*. For example, the display parameters can include brightness, contrast, color gamut, and similar.

The second display device 204*b* determines if the supported protocol version of the third display device 204*c* is received (412). For example, the second display device 204*b* determines if the supported protocol version of the third display device 204c is received in response to the request for the supported protocol version.

When the second display device 204b determines that the supported protocol version of the third display device 204c is received, the second display device 204b compares the supported protocol version of the second display device 204b and the supported protocol version of the third display device 204c (414). The second display device 204b, in response to the comparing, can identify a lowest (or minimum) supported protocol version of the supported protocol versions of the second display device 204b and the third display device 204c. For example, the second display device 204b can determine that the lowest supported protocol version is the supported protocol version of the third display device 204c.

In other words, the second display device 204b negotiates a supported protocol version that is common to both the second display device 204b and the third display device 204c.

The second display device 204b transmits the lowest supported protocol version of the supported protocol version of the second display device 204b and the third display device 204c to the first display device 204a upstream (416). For example, the second display device 204b can transmit the supported protocol version of the third display device 204c to the first display device 204a as the supported protocol version of the third display device 204c is the lowest (minimum) supported protocol version of the supported protocol versions of the second display device 204b and the third display device 204c.

In some examples, the second display device 204b transmits the lowest supported protocol version of the supported protocol version of the second display device 204b and the third display device 204c to the first display device 204a only in response to receiving the supported protocol version of the third display device 204c. In other words, the second display device 204b can only respond/transmit to the first display device 204a after the third display device 204c has responded/transmitted to the second display device 204b.

The first display device 204a compares a supported protocol version of the first display device 204a and the lowest supported protocol version of the supported protocol versions of the second display device 204b and the third display device 204c (418). The first display device 204a, in response to the comparing, can identify a lowest (or minimum) supported protocol version of the supported protocol versions of i) the first display device 204a, and ii) the lowest supported protocol versions of the second display device 204b and the third display device 204c. For example, when the supported protocol version of the third display device 204c is the lowest supported protocol version of the second display device 204b and the third display device 204c, the first display device 204a can compare the supported protocol version of the first display device 204a and the supported protocol version of the third display device 204c.

In other words, the first display device 204a negotiates a supported protocol version that is common to both the first display device 204a, the second display device 204b, and the third display device 204c.

The first display device 204a can set a lowest (or minimum) supported protocol version indicator (lowest protocol version) as the lowest supported protocol version among the supported protocol versions of i) the first display device 204a, and ii) the lowest supported protocol versions of the second display device 204b and the third display device 204c (420). For example, the first display device 204a can set the lowest supported protocol version indicator as the supported protocol version of the third display device 204c.

The first display device 204a can transmit the lowest supported protocol version indicator (lowest protocol version) to the second display device 204b (downstream) (422). For example, the first display device 204a can transmit the supported protocol version of the third display device 204c to the second display device 204b. The second display device 204b can transmit the lowest supported protocol version indicator (lowest protocol version) to the third display device (downstream) (424). For example, the second display device 204b can transmit the supported protocol version of the third display device 204c to the third display device 204c. The second display device 204b can transmit the lowest supported protocol version indicator to the third display device 204c in response to receiving the lowest supported protocol version indicator from the first display device 204a.

The first display device 204a can transmit display preferences to the second display device 204b based on the lowest supported protocol version indicator (426). For example, the first display device 204a can transmit display preferences to the second display device 204b based on the supported protocol version of the third display device 204c.

The second display device 204b can transmit display preferences to the third display device 204c based on the lowest supported protocol version indicator (428). For example, the second display device 204b can transmit display preferences to the third display device 204c based on the supported protocol version of the third display device 204c.

In some examples, when the second display device 204b does not receive the model information from the third display device 204c within the time limit, the second display device 204b sets a time out signal and sets an indicator to indicate that the third display device 204c is not supported (428). That is, in some examples, when the second display device 204b is not supported for synchronization, the second display device 204b cannot be synchronized with another display device such as the first display device 204a (e.g., display parameters of the second display device 204b are able to be synchronized). In other words, when the first display device 204a does not receive the model information from the second display device 204b within the time limit (or threshold), the second display device 204b is considered a "legacy" display device.

In some examples, when the second display devices 204b determines that the supported protocol version of the third display device 204c has not been received, the method 400 returns to step 412 and waits until the second display devices 204b determines that the supported protocol version of the third display device 204c has been received.

In some examples, synchronization between the display devices 204 is initiates at the first display device 204a and propagates downstream to the second display device 204b, and then to the third display device 204c. For example, during the first synchronization between the display devices 204, the synchronization occurs from the first display device 204a and propagated downstream ultimately to the third display device 204c. In some examples, synchronization between the display devices can be initiated at any of the display devices 204 and propagated upstream or downstream. For example, during a subsequent synchronization between the display devices 204 (e.g., after the initial synchronization), the synchronization can be initiated at any of the display devices 204.

Figure 5:
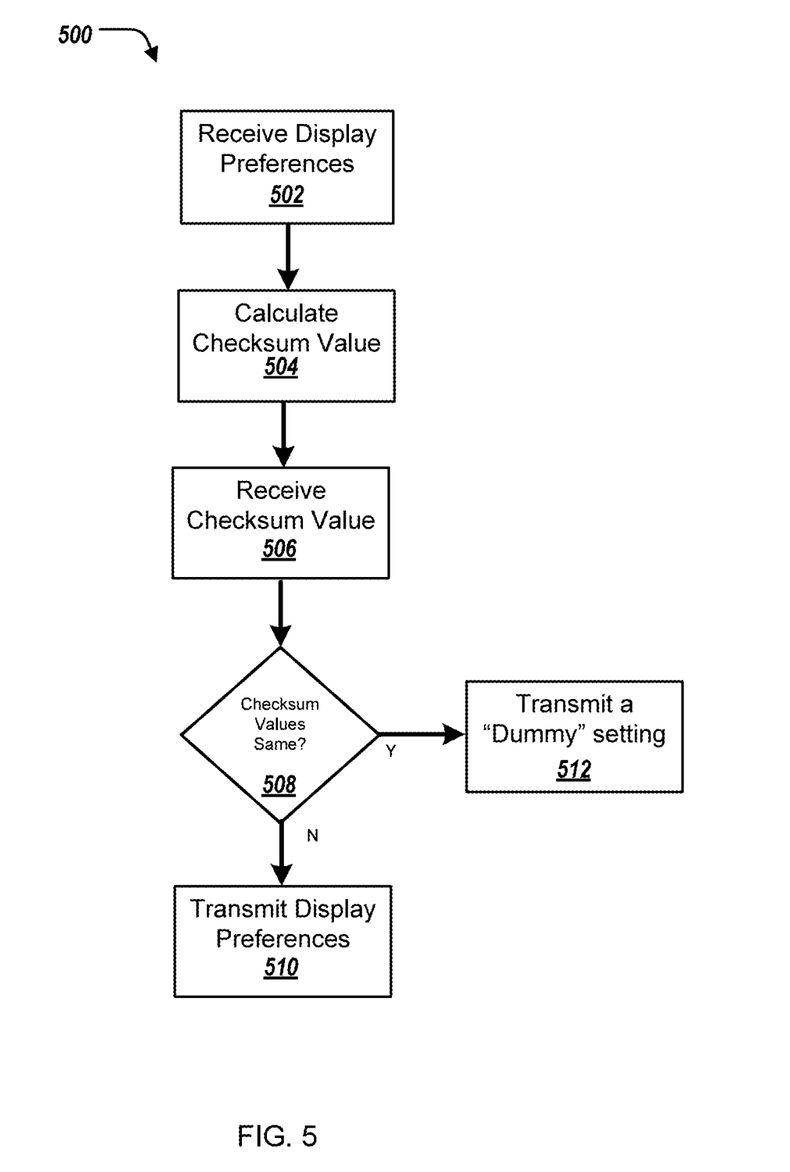

FIG. 5 illustrates a flowchart depicting selected elements of an embodiment of a method 500 for synchronizing preferences between the multiple displays 204 connected to the information handling system 202. The method 500 may be performed by the information handling system 100, the information handling system 202, the display devices 204 and/or the synchronization computing module 206, and with reference to FIGS. 1-2. It is noted that certain operations described in method 500 may be optional or may be rearranged in different embodiments.

The second display device 204b receives the display preferences (502). The second display device 204b calculates a checksum value for the second display device 204b based on the display preferences (504). In some example, the second display device 204b calculates the checksum value in response to receiving the display preferences. The second display device 204b can receive a checksum value for the third display device 204c from the third display device 204c (506). The checksum value for the third display device 204c can be based on display preferences at the third display device 204c. The second display device 204b can determine whether the checksum value for the third display device 204c is the same as the checksum value for the second display device (508). When the second display device 204b determines that the checksum value for the third display device 204c is different that the checksum value for the second display device 204b, the second display device 204b transmits the display preferences to the third display device 204c (510). When the second display device 204b determines that the checksum value for the third display device 204c is the same as the checksum value for the second display device 204b, the second display device 204b transmits a "dummy" setting (e.g., any setting with the value same as current to maintain checksum unchanged and signal completion of synchronization) to the third display device 204c (512).

In some examples, the display devices 204 can implement a check out flag to prevent simultaneous data change at the display devices 204 that may cause data conflict. Specifically, as display preferences can be transmitted upstream and downstream among the display devices, a check out flag is implemented to control access to the display preferences such that only one display device 204 is allowed to adjust the display preferences at a time. For example, when the display preferences are adjusted on a particular display device 204, the particular display device 204 sets the check out flag (e.g., to a value of 1 or TRUE) and transmits data indicating such downstream (e.g., to display devices 204 downstream from the particular display device 204). The upstream display devices 204 (upstream to the particular display device 204) can poll the check out flag at regular intervals. When multiple display devices 204 are attempting to adjust display preferences and synchronize such, the lowest tier display device 204—the display device 204 closest to connection to the information handling system 202—is given priority. This is achieved by i) when a particular display device 204 receives the check out flag set (e.g., to a value of 1 or TRUE) from an upstream display device 204, the particular display device 204 is prevented from adjusting display preferences; and ii) when a particular display device 204 polls the check out flag (e.g., a value of 1 or TRUE) from a downstream display device 204, the particular display device 204 is able to adjust display preferences.

Figure 6:
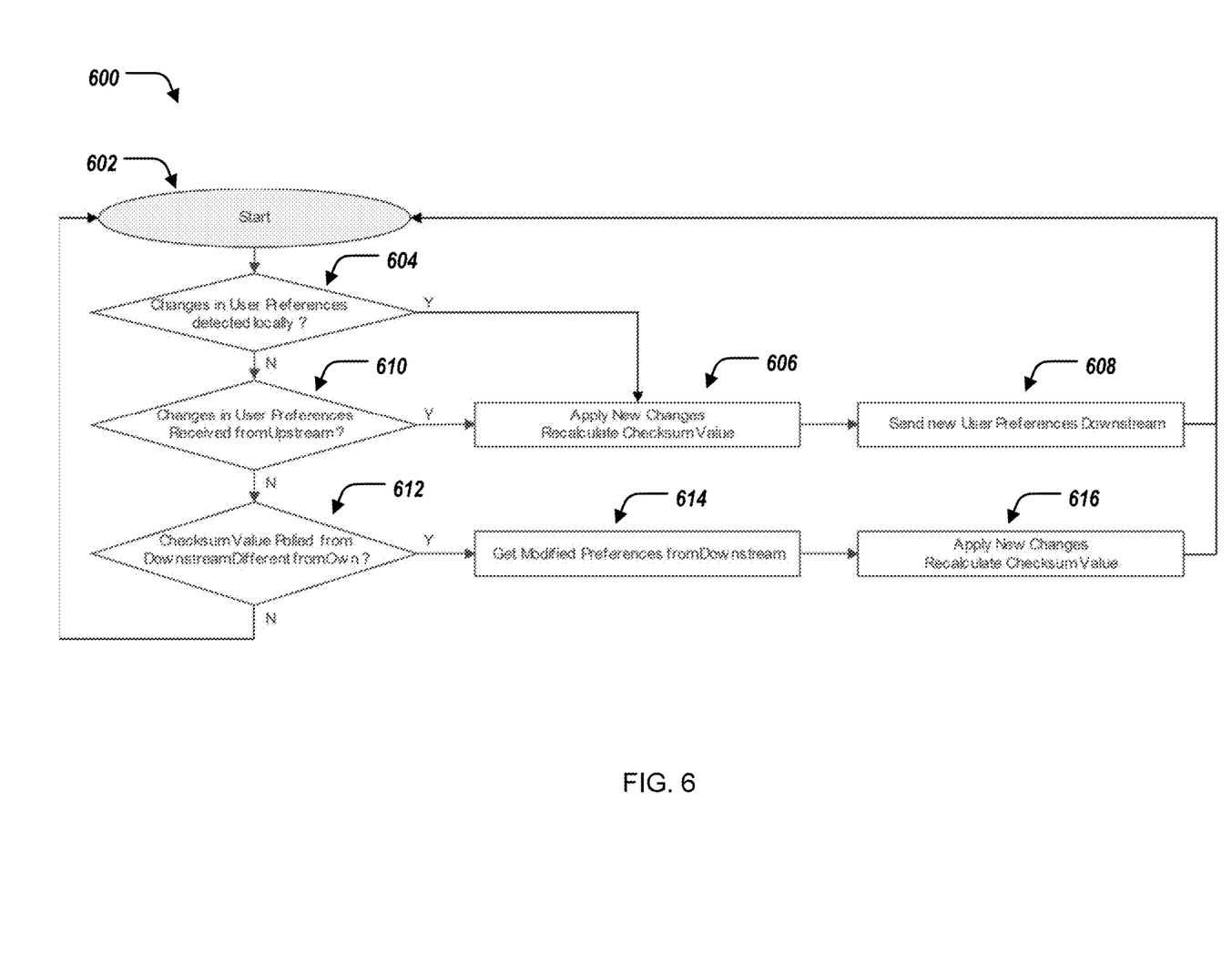
FIG. 6 illustrates a method for background synchronization between multiple display devices connected to an information handling system.

FIG. 6 illustrates a flowchart depicting selected elements of an embodiment of a method 600 for background synchronization between the multiple displays 204 connected to the information handling system 202. The method 600 may be performed by the information handling system 100, the information handling system 202, the display devices 204 and/or the synchronization computing module 206, and with reference to FIGS. 1-2. It is noted that certain operations described in method 600 may be optional or may be rearranged in different embodiments.

The method starts (602), and a particular display device 204 determines if changes in user preferences are detected locally at the particular display device (604). When the particular display device 204 determines that changes in user preferences are detected locally, the particular display device 204 applies the new changes, and recalculates the checksum value. For example, the second display device 204b can determine that changes in user preferences are detected locally, and applies the new changes, and recalculates the checksum value at the second display device 204b. The particular display device 204 transmits the new user preferences downstream (606). For example, the second display device 204b transmits the new user preferences to the third display device 204c.

When the particular display device 204 does not determine that changes in user preferences are detected locally, the particular display device 204 determines if changes in user preferences are received from upstream (610). When the particular display device 204 determines that changes in user preferences are received upstream, the process proceed to step 606. For example, the second display device 204b can determine that user preferences are received upstream, and applies the new changes, and recalculates the checksum value at the second display device 204b.

When the particular display device 204 does not determine changes in user preferences are received from upstream, the particular display device 204 determines if the polled checksum value from downstream is different from it's own checksum value (612). When the particular display device 204 determines that the polled checksum value from downstream is different from it's own checksum value, the particular display device 204 obtains the modified preferences from downstream (614) and applies the new changes, and recalculates the checksum value (616). For example, the second display device 204b determines that the polled checksum value from downstream is different from it's own checksum value, and in response, obtains the modified preferences from downstream and applies the new changes, and recalculates the checksum value at the second display device 204b.

When the particular display device 204 determines that the polled checksum value from downstream is not different from it's own checksum value, the method returns to step 602.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of synchronizing preferences between multiple displays, the method comprising:
   receiving, at a first display device, a signal indicating a second display device is coupled to the first display device and in a powered-on state, the first display device coupled to an information handling system;
   providing, by the first display device, a request to the second display device for a model information of the second display device;
   in response to the request for the model information, i) receiving, at the first display device, the model information of the second display device indicating that the second display device is supported, and ii) providing, by the first display device, a request to the second display device for a supported protocol version of the second display device, the supported protocol version of the second display device indicating at least display parameters of the second display device;
   in response to the request for the supported protocol version, receiving, at the first display device, the supported protocol version of the second display device;
   comparing, at the first display device, a supported protocol version of the first display device and the supported protocol version of the second display device to identify a lowest supported protocol version of the supported protocol version of the first display device and the supported protocol version of the second display device, the supported protocol version of the first display device indicating at least display parameters of the first display device;
   setting, by the first display device, a lowest supported protocol version indicator as the lowest supported protocol version among the supported protocol version of the first display device and the supported protocol version of the second display device;
   transmitting, by the first display device, the lowest supported protocol version indicator to the second display device; and
   transmitting, by the first display device, display preferences to the second display device, the display preferences based on the lowest supported protocol version indicator.

2. The method of claim 1, further comprising:
   receiving, at the second display device, a signal indicating a third display device is coupled to the second display device and in a powered-on state;
   providing, by the second display device, a request to the third display device for a model information of the third display device;
   in response to the request for the model information, i) receiving, at the second display device, the model information of the third display device indicating that the third display device is supported, and ii) providing, by the second display device, a request to the third display device for a supported protocol version of the third display device, the supported protocol version of the third display device indicating at least display parameters of the third display device;
   in response to the request for the supported protocol version, receiving, at the second display device, the supported protocol version of the third display device;
   comparing, at the second display device, the supported protocol version of the second display device and the supported protocol version of the third display device to identify a lowest supported protocol version of the supported protocol version of the second display device and the supported protocol version of the third display device; and
   transmitting, by the second display device, the lowest supported protocol version of the supported protocol version of the second display device and the supported protocol version of the third display device to the first display device.

3. The method of claim 2, further comprising:
   comparing, at the first display device, i) the supported protocol version of the first display device and ii) the lowest supported protocol version of the supported protocol version of the second display device and the supported protocol version of the third display device;
   setting, by the first display device, the lowest supported protocol version indicator as the lowest supported protocol version among i) the supported protocol version of the first display device and ii) the lowest supported protocol version of the supported protocol version of the second display device and the supported protocol version of the third display device; and
   transmitting, by the first display device, the lowest supported protocol version indicator to the second display device.

4. The method of claim 3, further comprising:
   transmitting, by the second display device, the lowest supported protocol version indicator to the third display device in response to receiving the lowest supported protocol version indicator from the first display device.

5. The method of claim 4, further comprising:
   transmitting, by the first display device, display preferences to the second display device, the display preferences based on the lowest supported protocol version indicator; and
   transmitting, by the second display device, display preferences to the third display device, the display preferences based on the lowest supported protocol version indicator.

6. The method of claim 5, further comprising:
receiving, at the second display device, the display preferences;
in response to receiving the display preferences, calculating, at the second display device, a checksum value for the second display device based on the display preferences;
receiving, at the second display device, a checksum value for the third display device;
determining that the checksum value for the third display device is not the same as the checksum value for the second display device; and
in response to the determining, transmitting, by the second display device, the display preferences to the third display device.

7. The method of claim 2, wherein the second display device transmits the lowest supported protocol version of the supported protocol version of the second display device and the supported protocol version of the third display device to the first display device only in response to receiving the supported protocol version of the third display device.

8. The method of claim 1, further comprising:
in response to the request for the model information, receiving, a time out signal; and
in response to the time out signal, setting an indictor to indicate that the second display device is not supported.

9. A display device computing environment, each display device comprising a processor having access to memory media storing instructions executable by the processor to perform operations comprising:
receiving, at a first display device, a signal indicating a second display device is coupled to the first display device and in a powered-on state, the first display device coupled to an information handling system;
providing, by the first display device, a request to the second display device for a model information of the second display device;
in response to the request for the model information, i) receiving, at the first display device, the model information of the second display device indicating that the second display device is supported, and ii) providing, by the first display device, a request to the second display device for a supported protocol version of the second display device, the supported protocol version of the second display device indicating at least display parameters of the second display device;
in response to the request for the supported protocol version, receiving, at the first display device, the supported protocol version of the second display device;
comparing, at the first display device, a supported protocol version of the first display device and the supported protocol version of the second display device to identify a lowest supported protocol version of the supported protocol version of the first display device and the supported protocol version of the second display device, the supported protocol version of the first display device indicating at least display parameters of the first display device;
setting, by the first display device, a lowest supported protocol version indicator as the lowest supported protocol version among the supported protocol version of the first display device and the supported protocol version of the second display device;
transmitting, by the first display device, the lowest supported protocol version indicator to the second display device; and
transmitting, by the first display device, display preferences to the second display device, the display preferences based on the lowest supported protocol version indicator.

10. The display device computing environment of claim 9, the operations further comprising:
receiving, at the second display device, a signal indicating a third display device is coupled to the second display device and in a powered-on state;
providing, by the second display device, a request to the third display device for a model information of the third display device;
in response to the request for the model information, i) receiving, at the second display device, the model information of the third display device indicating that the third display device is supported, and ii) providing, by the second display device, a request to the third display device for a supported protocol version of the third display device, the supported protocol version of the third display device indicating at least display parameters of the third display device;
in response to the request for the supported protocol version, receiving, at the second display device, the supported protocol version of the third display device;
comparing, at the second display device, the supported protocol version of the second display device and the supported protocol version of the third display device to identify a lowest supported protocol version of the supported protocol version of the second display device and the supported protocol version of the third display device; and
transmitting, by the second display device, the lowest supported protocol version of the supported protocol version of the second display device and the supported protocol version of the third display device to the first display device.

11. The display device computing environment of claim 10, the operations further comprising:
comparing, at the first display device, i) the supported protocol version of the first display device and ii) the lowest supported protocol version of the supported protocol version of the second display device and the supported protocol version of the third display device;
setting, by the first display device, the lowest supported protocol version indicator as the lowest supported protocol version among i) the supported protocol version of the first display device and ii) the lowest supported protocol version of the supported protocol version of the second display device and the supported protocol version of the third display device; and
transmitting, by the first display device, the lowest supported protocol version indicator to the second display device.

12. The display device computing environment of claim 11, the operations further comprising:
transmitting, by the second display device, the lowest supported protocol version indicator to the third display device in response to receiving the lowest supported protocol version indicator from the first display device.

13. The display device computing environment of claim 12, the operations further comprising:
transmitting, by the first display device, display preferences to the second display device, the display preferences based on the lowest supported protocol version indicator; and transmitting, by the second display device, display preferences to the third display device, the display preferences based on the lowest supported protocol version indicator.

14. The display device computing environment of claim 13, the operations further comprising:
   receiving, at the second display device, the display preferences;
   in response to receiving the display preferences, calculating, at the second display device, a checksum value for the second display device based on the display preferences;
   receiving, at the second display device, a checksum value for the third display device;
   determining that the checksum value for the third display device is not the same as the checksum value for the second display device; and
   in response to the determining, transmitting, by the second display device, the display preferences to the third display device.

15. The display device computing environment of claim 10, wherein the second display device transmits the lowest supported protocol version of the supported protocol version of the second display device and the supported protocol version of the third display device to the first display device only in response to receiving the supported protocol version of the third display device.

16. The display device computing environment of claim 9, the operations further comprising:
   in response to the request for the model information, receiving, a time out signal; and
   in response to the time out signal, setting an indictor to indicate that the second display device is not supported.

17. A non-transitory computer-readable medium storing software comprising instructions executable by one or more computers which, upon such execution, cause the one or more computers to perform operations comprising:
   receiving, at a first display device, a signal indicating a second display device is coupled to the first display device and in a powered-on state, the first display device coupled to an information handling system;
   providing, by the first display device, a request to the second display device for a model information of the second display device;
   in response to the request for the model information, i) receiving, at the first display device, the model information of the second display device indicating that the second display device is supported, and ii) providing, by the first display device, a request to the second display device for a supported protocol version of the second display device, the supported protocol version of the second display device indicating at least display parameters of the second display device;
   in response to the request for the supported protocol version, receiving, at the first display device, the supported protocol version of the second display device;
   comparing, at the first display device, a supported protocol version of the first display device and the supported protocol version of the second display device to identify a lowest supported protocol version of the supported protocol version of the first display device and the supported protocol version of the second display device, the supported protocol version of the first display device indicating at least display parameters of the first display device;
   setting, by the first display device, a lowest supported protocol version indicator as the lowest supported protocol version among the supported protocol version of the first display device and the supported protocol version of the second display device;
   transmitting, by the first display device, the lowest supported protocol version indicator to the second display device; and
   transmitting, by the first display device, display preferences to the second display device, the display preferences based on the lowest supported protocol version indicator.

18. The computer-readable medium of claim 17, the operations further comprising:
   receiving, at the second display device, a signal indicating a third display device is coupled to the second display device and in a powered-on state;
   providing, by the second display device, a request to the third display device for a model information of the third display device;
   in response to the request for the model information, i) receiving, at the second display device, the model information of the third display device indicating that the third display device is supported, and ii) providing, by the second display device, a request to the third display device for a supported protocol version of the third display device, the supported protocol version of the third display device indicating at least display parameters of the third display device;
   in response to the request for the supported protocol version, receiving, at the second display device, the supported protocol version of the third display device;
   comparing, at the second display device, the supported protocol version of the second display device and the supported protocol version of the third display device to identify a lowest supported protocol version of the supported protocol version of the second display device and the supported protocol version of the third display device; and
   transmitting, by the second display device, the lowest supported protocol version of the supported protocol version of the second display device and the supported protocol version of the third display device to the first display device.

19. The computer-readable medium of claim 18, the operations further comprising:
   comparing, at the first display device, i) the supported protocol version of the first display device and ii) the lowest supported protocol version of the supported protocol version of the second display device and the supported protocol version of the third display device;
   setting, by the first display device, the lowest supported protocol version indicator as the lowest supported protocol version among i) the supported protocol version of the first display device and ii) the lowest supported protocol version of the supported protocol version of the second display device and the supported protocol version of the third display device; and
   transmitting, by the first display device, the lowest supported protocol version indicator to the second display device.

20. The computer-readable medium of claim 19, the operations further comprising:
   transmitting, by the second display device, the lowest supported protocol version indicator to the third display device in response to receiving the lowest supported protocol version indicator from the first display device.

* * * * *